United States Patent
Gouvernel et al.

(10) Patent No.: US 10,303,592 B2
(45) Date of Patent: May 28, 2019

(54) MULTIPLE DEVICE TESTING SYSTEM

(71) Applicant: ADP, LLC, Roseland, NJ (US)

(72) Inventors: Jerome Gouvernel, Brooklyn, NY (US); Jordan Schiffer, Brooklyn, NY (US); Hadar Yacobovitz, New York, NY (US); Nick Heasman, New York, NY (US)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 14/635,388

(22) Filed: Mar. 2, 2015

(65) Prior Publication Data

US 2016/0259719 A1 Sep. 8, 2016

(51) Int. Cl.
*G06F 8/38* (2018.01)
*G06F 11/36* (2006.01)
*G06F 9/455* (2018.01)

(52) U.S. Cl.
CPC ............ *G06F 11/3696* (2013.01); *G06F 8/38* (2013.01); *G06F 9/455* (2013.01); *G06F 11/3672* (2013.01)

(58) Field of Classification Search
CPC ................ G06F 7/78; G06F 8/00–8/78; G06F 9/44–9/455; G06F 11/36; G06F 8/38; G06F 11/3672; G06F 11/3696
USPC ......... 717/124–135; 703/13, 20, 21; 714/37, 714/38.1
See application file for complete search history.

(56) References Cited

U.S. PATENT DOCUMENTS

| | | | |
|---|---|---|---|
| 8,504,348 B2 | 8/2013 | Error | |
| 8,589,140 B1 | 11/2013 | Poulin | |
| 8,819,490 B2 | 8/2014 | Li et al. | |
| 2004/0015893 A1* | 1/2004 | Banavar | G06F 9/4443 717/138 |
| 2014/0236776 A1 | 8/2014 | Fries et al. | |
| 2014/0337706 A1* | 11/2014 | Hsu | G06F 17/30274 715/234 |
| 2015/0082282 A1* | 3/2015 | Larsen | G06F 11/3668 717/125 |
| 2015/0082283 A1* | 3/2015 | Smith | G06F 11/3692 717/125 |

(Continued)

FOREIGN PATENT DOCUMENTS

| | | |
|---|---|---|
| WO | 2006091785 A1 | 8/2006 |
| WO | 2006093762 A1 | 9/2006 |

OTHER PUBLICATIONS

Pugsley et al., "What is Responsinator?," Batch Trading Company Limited, Nov. 2013, 2 pages, accessed Mar. 2, 2015. http://www.responsinator.com/about/.

*Primary Examiner* — Qing Chen
(74) *Attorney, Agent, or Firm* — Yee & Associates, P.C.

(57) ABSTRACT

A method and apparatus for testing an application. The method displays, by a computer system, simulations of a graphical user interface for the application for a group of different types of devices on a display system. The method further displays, by the computer system, a group of controls in the graphical user interface displayed in the group of different types of devices on the display system. The method still further displays, by the computer system, a change to the graphical user interface in all of the simulations when a user input manipulates a control in a simulation in the simulations. A testing of the graphical user interface for the application for the group of different types of devices is enabled.

14 Claims, 13 Drawing Sheets

(56) References Cited

U.S. PATENT DOCUMENTS

2015/0143337 A1* 5/2015 Bauer ...................... G06F 8/34
717/122

* cited by examiner

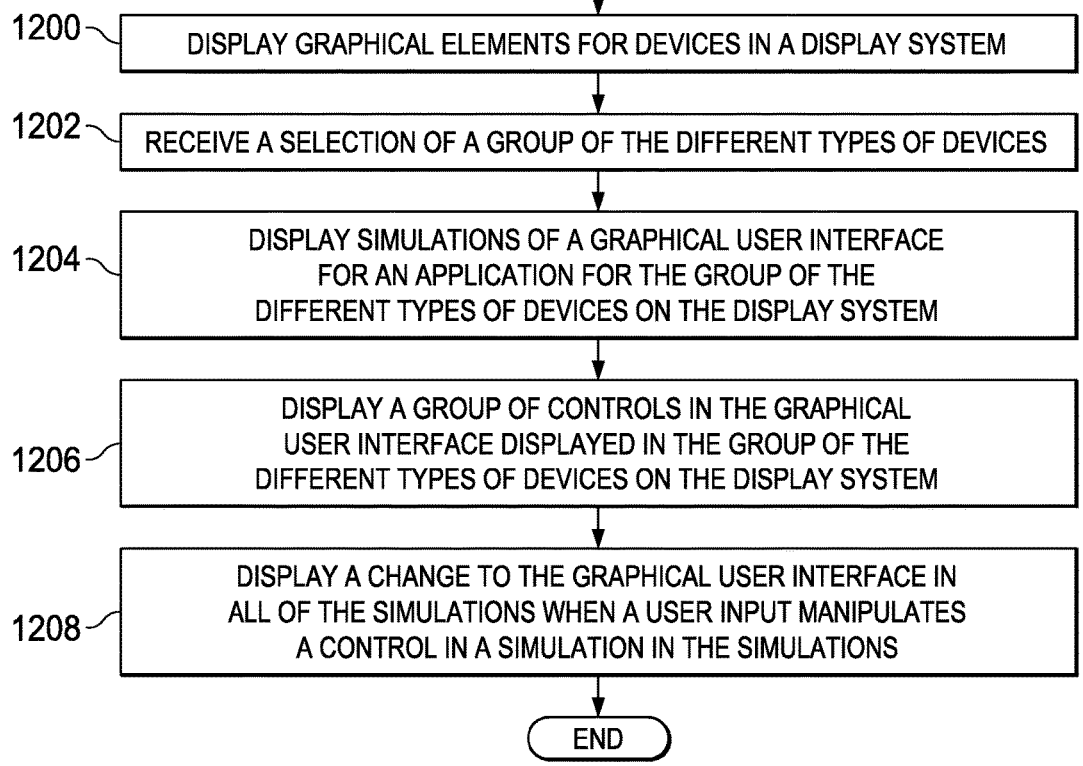
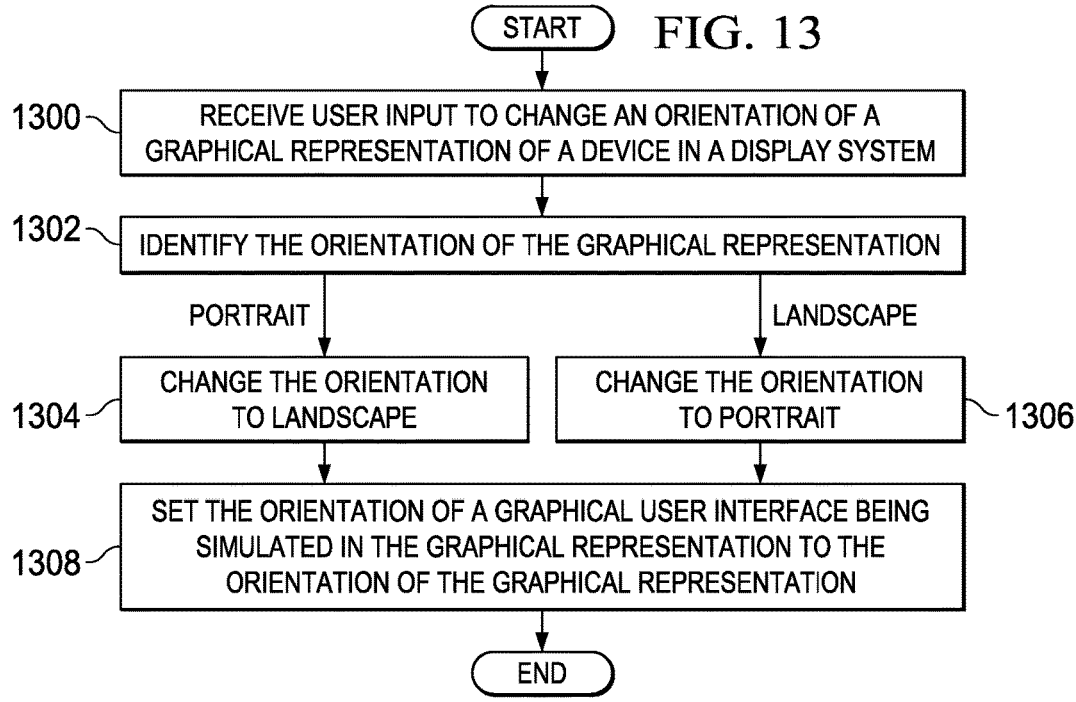

MULTIPLE DEVICE TESTING SYSTEM

BACKGROUND INFORMATION

1. Field:

The present disclosure relates generally to an improved computer system, and in particular, to a method and apparatus for testing devices using a computer system. Still more particularly, the present disclosure relates to a method and apparatus for testing the display of graphical user interfaces on devices using the computer system.

2. Background:

Applications may be run on many different types of devices. These different types of devices may include, for example, a mobile phone, a tablet computer, a laptop computer, a desktop computer, a browser, a version of a browser, and other types of devices or displaying software.

These different types of devices have displays that have different sizes. With the different sizes, the manner in which an application displays information may be different between different types of devices. These different types of devices may also have different display software such as, for example, different browsers or different versions of the same browser. Additionally, some devices may have displays that change orientation. For example, a mobile phone may change between a landscape and a portrait orientation while the display on a desktop computer may not change orientations.

With the differently sized screens, different displaying software, and potentially different orientations, the manner in which applications display information may be different. For example, the same webpage may be displayed on the same type of browser on a mobile phone and a desktop computer. The manner in which the webpage is displayed, however, may be different between the mobile phone and the desktop computer.

In developing applications that are run on different types of devices, the applications are typically tested on the different types of devices prior to releasing the application to customers. For example, a browser with a webpage may be loaded onto a mobile phone, a tablet computer, and a desktop computer. The testing may involve loading and displaying the webpage using the browser on each of these devices.

The manner in which the webpage is displayed by the browser on these devices may then be observed to determine whether the browser displays the webpage in a desired manner. The testing of the webpage displayed in the browser on the device may include selecting links, changing the orientation on devices that have changeable orientations, and other suitable operations.

This type of testing may be more time-consuming than desired. For example, one or more human operators may load the web browsers and webpages on each of the devices that are to be tested. For example, when testing mobile phones, many different types of mobile phones may be tested that have different displays. Additionally, testing the manner in which an application displays information in response to user input occurs with an operator performing the same user input on each of the different devices. This type of testing is often tedious in addition to time-consuming.

Therefore, it would be desirable to have a method and apparatus that take into account at least some of the issues discussed above, as well as other possible issues. For example, it would be desirable to have a method and apparatus that test applications on multiple types of devices more efficiently than currently possible.

SUMMARY

An embodiment of the present disclosure provides a method for testing an application. The method displays, by a computer system, simulations of a graphical user interface for the application for a group of different types of devices on a display system. The method further displays, by the computer system, a group of controls in the graphical user interface displayed in the group of different types of devices on the display system. The method still further displays, by the computer system, a change to the graphical user interface in all of the simulations when a user input manipulates a control in a simulation in the simulations. A testing of the graphical user interface for the application for the group of different types of devices is enabled.

Another embodiment of the present disclosure provides a computer system comprising a display system and a device tester. The device tester is in communication with the display system. The device tester displays simulations of a graphical user interface for an application for a group of different types of devices on the display system. The device tester further displays a group of controls in the graphical user interface displayed in the group of different types of devices on the display system. The device tester still further displays a change to the graphical user interface in all of the simulations when a user input manipulates a control in a simulation in the simulations. A testing of the graphical user interface for the application for the group of different types of devices is enabled.

Yet another embodiment of the present disclosure provides a computer program product for testing an application. The computer program product comprises a computer readable storage media, first program code, second program code, and third program code. The first program code is stored on the computer readable storage media and displays simulations of a graphical user interface for the application for a group of different types of devices on a display system. The second program code is stored on the computer readable storage media and displays a group of controls in the graphical user interface displayed in the group of different types of devices on the display system. The third program code is stored on the computer readable storage media and displays a change to the graphical user interface in all of the simulations when a user input manipulates a control in a simulation in the simulations. A testing of the graphical user interface for the application for the group of different types of devices is enabled.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 12 is an illustration of a flowchart of a process for testing an application is depicted in accordance with an illustrative embodiment;

FIG. 13 is an illustration of a flowchart of a process for manipulating a graphical representation of a device in accordance with an illustrative embodiment.

DETAILED DESCRIPTION

The illustrative embodiments recognize and take into account one or more different considerations. For example, the illustrative embodiments recognize and take into account that it may be desirable to test devices at the same time. For example, the illustrative embodiments recognize and take into account that applying the same user input to a graphical user interface for an application on different devices may be reduced by applying this user input to all of the instances of the application running on the different devices when the user input is applied to one of the instances of the application.

Thus, the illustrative embodiments provide a method and apparatus for testing applications. For example, a method for testing an application may include displaying simulations of the graphical user interface for an application for a group of the different types of devices on a display system. A group of controls is displayed in the graphical user interface displayed in the group of different types of devices on the display system. A change to the graphical user interface in all of the simulations is displayed when a user input manipulates a control in a simulation in the simulations, wherein a testing of the graphical user interface for the group of devices is enabled.

Figure 1:
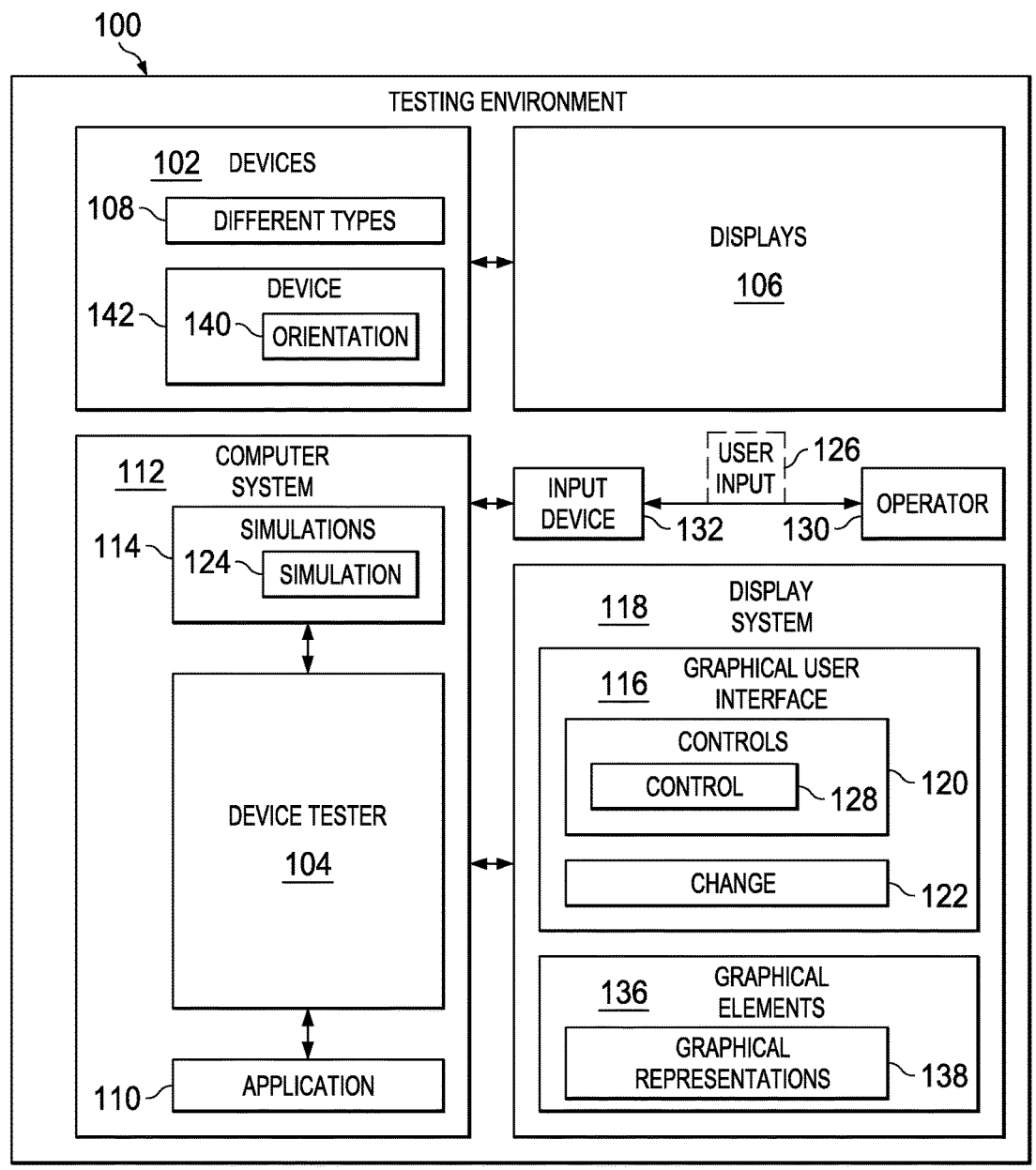
FIG. 1 is an illustration of a block diagram of a testing environment in accordance with an illustrative embodiment.

With reference now to the figures, and in particular, with reference to FIG. 1, an illustration of a block diagram of a testing environment is depicted in accordance with an illustrative embodiment. In this illustrative example, testing environment 100 includes devices 102 that may be tested using device tester 104.

In this illustrative example, devices 102 are physical devices that process and display information on displays 106. In this illustrative example, different types 108 of devices 102 are present. Devices 102 may be selected from at least one of a mobile phone, a personal digital assistant, a tablet computer, a laptop computer, a desktop computer, a wearable computer, smart glasses, or some other suitable type of device. Displays 106 are physical devices that display information on devices 102. In this illustrative example, each device in devices 102 has one or more of displays 106.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category. A number of items is one or more items.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, device tester 104 may test application 110. In particular, device tester 104 may test how application 110 runs on a group of devices 102. As used herein, a "group of," when used with reference items, means one or more items. For example, a group of devices 102 is one or more of devices 102.

In the illustrative example, application 110 may be selected from one of a web browser, a word processor, a spreadsheet, a presentation application, a human resources application, a payroll application, or some other suitable type of application. In another example, application 110 may include a web browser and a webpage. In the illustrative example, the webpage may include scripts, applets, or other program code that may operate in conjunction with the web browser for application 110.

Device tester 104 may be implemented in software, hardware, firmware or a combination thereof. When software is used, the operations performed by device tester 104 may be implemented in program code configured to run on hardware, such as a processor unit. When firmware is used, the operations performed by device tester 104 may be implemented in program code and data and stored in persistent memory to run on a processor unit. When hardware is employed, the hardware may include circuits that operate to perform the operations in device tester 104.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In the illustrative example, device tester 104 may be implemented in computer system 112. Computer system 112 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

As depicted, device tester 104 may test application 110 performed by device tester 104 without loading and running application 110 on each of devices 102. Instead, device tester 104 may test application 110 using simulations 114. In the illustrative example, simulations 114 are simulations of application 110. Device tester 104 runs simulations 114 in computer system 112 and not on devices 102.

In the illustrative examples, a simulation is an imitation of a process or system that runs on devices 102. In this illustrative example, simulations 114 run by device tester 104 simulate how application 110 would run on the group of devices 102.

In the illustrative example, simulations 114 may take various forms. For example, simulations 114 may be a process that is designed to run as application 110 would run in each of devices 102 when run by device tester 104 in computer system 112. In one illustrative example, application 110 is a web browser. A simulation in simulations 114 may be a frame for a web browser with a webpage. The frame may be for a web browser that is designed to run on a particular device in devices 102.

For example, device tester 104 displays simulations 114 of graphical user interface 116 for application 110 for a group of different types 108 of devices 102 on display system 118. Display system 118 is a display system for computer system 112.

In this illustrative example, display system 118 is a hardware system and includes one or more display devices. The display devices may include at least one of a light emitting diode display (LED), a liquid crystal display (LCD), and an organic light emitting diode display (OLED), or some other suitable device on which simulations 114 can be displayed.

As depicted, device tester 104 displays a group of controls 120 in graphical user interface 116 displayed in the group of devices 102 on the display system 118. Device tester 104 also displays change 122 to graphical user interface 116 in simulation 124 in simulations 114 when user input 126 manipulates control 128 in simulation 124.

In the illustrative example, control 128 may take a number different forms. For example, control 128 may be selected from one of a dial, a slider, a check box, a link, a button, or some other suitable type of control.

In other words, control 128 is a graphical element that may be displayed when running application 110, and the graphical element may be manipulated by operator 130 in interacting with application 110. In this illustrative example, simulation 124 displays control 128 in graphical user interface 116 for application 110 on display system 118 in computer system 112 as part of simulating application 110 using simulations 114.

In this illustrative example, operator 130 may interact with graphical user interface 116 through user input 126 generated by input device 132 in computer system 112. Input device 132 may be, for example, a mouse, a keyboard, a trackball, a touchscreen, a stylus, or some other suitable type of input device. For example, a pointer may be displayed in graphical user interface 116 that corresponds to input device 132. In this example, input device 132 moves the pointer to perform at least one of selecting operations, sizing operations, or drag and drop operations in graphical user interface 116. In this manner, a testing of graphical user interface 116 for the group of devices 102 is enabled.

In this manner, operator 130 may apply user input 126 to control 128 in simulation 124 as displayed in display system 118. When simulations 114 are for multiple ones of devices 102, user input 126 to control 128 applies to all of simulations 114 displayed on display system 118. In this manner, operator 130 may visualize the display of graphical user interface 116 for different types 108 of devices 102 through simulations 114.

In one illustrative example, user input 126 to control 128 displayed in simulation 124 causes change 122 to graphical user interface 116. Device tester 104 displays change 122 to graphical user interface 116 in all of simulations 114 when user input 126 manipulates control 128 in simulation 124. In other words, user input 126 to control 128 causes change 122 in graphical user interface 116 that is reflected in all of simulations 114. Thus, when more than one simulation is present in simulations 114, change 122 to graphical user interface 116 is reflected in all of simulations 114 even though user input only is entered in one of simulations 114.

For example, device tester 104 may capture user input 126 to control 128 when user input 126 manipulates control 128 in simulation 124. In this example, device tester 104 then sends user input 126 to all of simulations 114. Sending user input 126 to all of simulations 114 causes change 122 in all of simulations 114.

In this manner, change 122 to graphical user interface 116 caused by user input 126 may be viewed in all of simulations 114 being run to test application 110 for the group of devices 102. In another illustrative example, user input 126 to control 128 in simulation 124 only causes change 122 to graphical user interface 116 in simulation 124 and not in graphical user interface 116 in other simulations that may be present in simulations 114.

As depicted, operator 130 may select which ones of devices 102 are used to test application 110 through simulations 114. In one illustrative example, a group of graphical elements 136 are displayed in display system 118. These graphical elements are graphic representations of devices 102. Operator 130 may select a group of devices 102 from graphical elements 136 displayed on display system 118. The selection is made through user input 126 in the depicted example.

Further, in displaying simulations 114 and the group of controls 120, these displays may be made using a group of graphical representations 138 for the group of devices 102. Simulations 114 are displayed on the group of graphical representations 138 in this particular example. In this manner, graphical representations 138 with simulations 114 displayed in display system 118 may provide a visualization of how devices 102 may display application 110. This type of visualization may be performed without running application 110 on each of devices 102.

Further, user input 126 to control 128 in simulation 124 may result in the same change in the display of graphical user interface 116 for application 110 in all of simulations 114. In this manner, testing of devices 102 may be performed more quickly and easily as compared to current testing procedures that do not use device tester 104.

Figure 2:
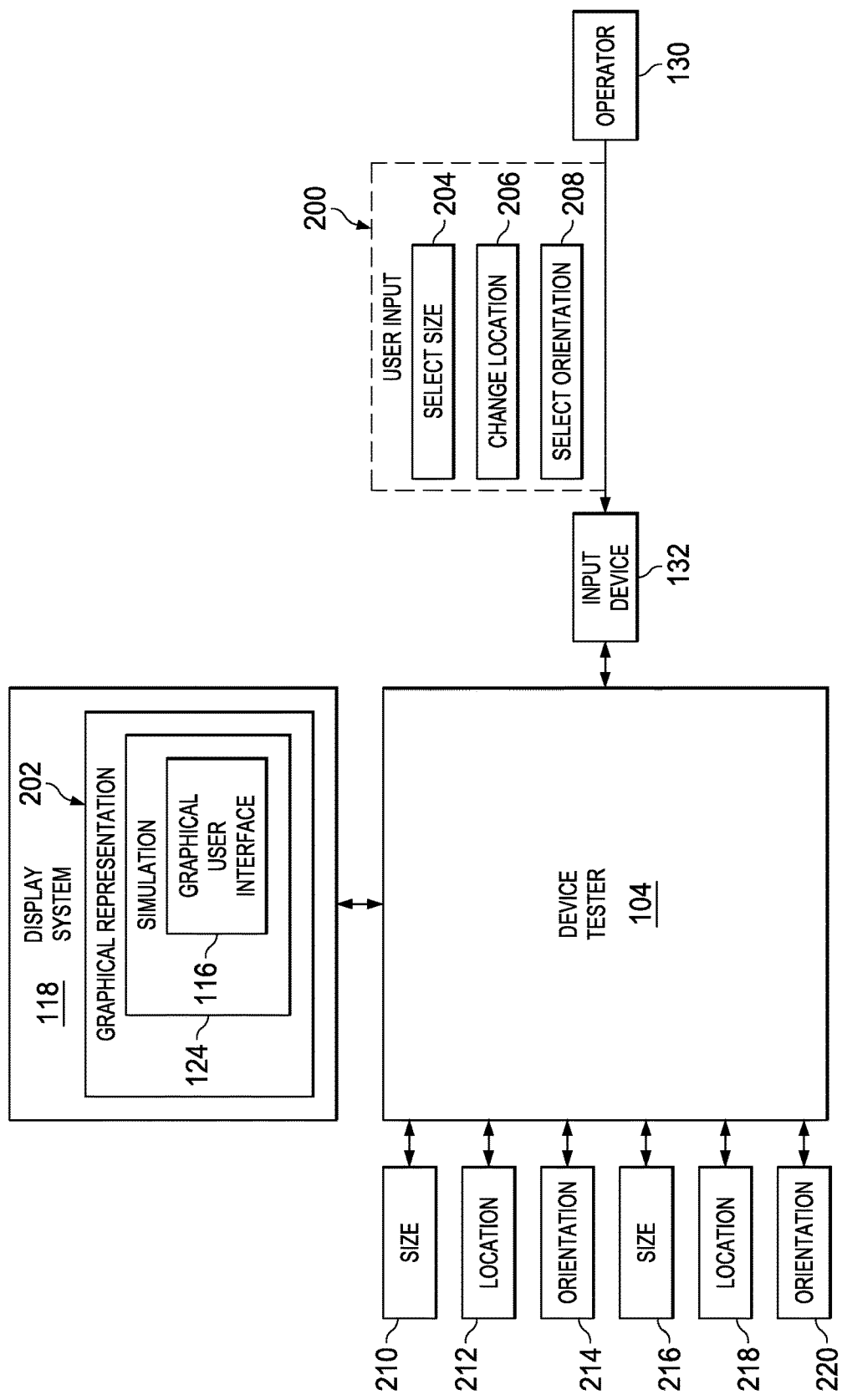
FIG. 2 is an illustration of a block diagram of information flow for an operator interacting with a device tester in accordance with an illustrative embodiment.

With reference next to FIG. 2, an illustration of a block diagram of information flow for an operator interacting with a device tester is depicted in accordance with an illustrative embodiment. In this illustrative example, device tester 104 receives user input 200 from operator 130 through input device 132. User input 200 may be referred to as further user input.

In the illustrative examples, the same reference numeral may be used in more than one figure. This reuse of a reference numeral in different figures represents the same element in the different figures.

As depicted, user input 200 is made to graphical representation 202. Device tester 104 displays graphical representation 202 on display system 118. Graphical representation 202 is for a particular device in devices 102 in FIG. 1. Graphical representation 202 is an example of a graphical representation in the group of graphical representations 138 in FIG. 1. Graphical user interface 116 in simulation 124 is displayed on a window in graphical representation 202.

User input 200 manipulates graphical representation 202 of the particular device. For example, user input 200 may be select size 204, change location 206, select orientation 208, or some other suitable input.

In this illustrative example, when user input 200 is select size 204, device tester 104 identifies size 210 of graphical representation 202. In this example, size 210 is based on user input 200. For example, user input 200 may include operator 130 using a mouse to select and drag a corner of graphical representation 202.

As depicted, when user input 200 is to change location 206, device tester 104 identifies location 212 for graphical representation 202. In this illustrative example, location 212 is based on user input 200. For example, user input 200 may include operator 130 using a mouse to select and drag graphical representation 202 to a desired location in display system 118.

In this example, the desired location may be a location suitable for visually testing simulation 124 of application 110. For example, the desired location may be in at least one of a center portion of display system 118, a top portion of display system 118, a left portion of display system 118, a right portion of display system 118, a bottom portion of display system 118, or some other suitable location. As another example, the desired location may be in a portion of display system 118 where other devices of a similar type are located. As still another example, the desired location may be a portion of display system 118 where sufficient space is available to display graphical representation 202 without overlapping any other graphical representations of devices in display system 118.

Device tester 104 identifies orientation 214 of graphical representation 202 when user input 200 is select orientation 208. For example, user input 200 may include operator 130 using a mouse to select a control located on graphical representation 202 that changes orientation 214. In this example, operator 130 changes orientation 214 to change at least one of the manner in which graphical representation 202 is displayed for a particular orientation or the manner in which graphical user interface 116 is displayed for the particular orientation.

Orientation 214 is a graphical orientation for graphical representation 202. A graphical orientation for an item is an orientation for information displayed on the item. For example, orientation 214 for graphical representation 202 identifies which orientation graphical user interface 116 uses to display graphical representation 202. Orientation 214 may be selected from at least one of portrait or landscape in this example.

As depicted, when device tester 104 identifies size 210, device tester 104 also identifies size 216 of graphical user interface 116. When device tester 104 identifies location 212, device tester 104 also identifies location 218 of graphical user interface 116. When device tester 104 identifies orientation 214, device tester 104 also identifies orientation 220 of graphical user interface 116.

In other words, user input 200 causing a change to size 210 causes an associated change to size 216. Size 210 may be referred to as a first size and size 216 may be referred to as a second size. User input 200 causing a change to location 212 causes an associated change to location 218. Location 212 may be referred to as a first location and location 218 may be referred to as a second location. User input 200 causing a change to orientation 214 causes an associated change to orientation 220. These changes are associated because graphical user interface 116 is displayed on the window in graphical representation 202.

As a result, computer system 112 operates as a special purpose computer system in which device tester 104 in computer system 112 enables testing of application 110 for devices 102 in FIG. 1. In particular, device tester 104 transforms computer system 112 into a special purpose computer system as compared to currently available general computer systems that do not have device tester 104.

In the illustrative example, device tester 104 allows for a visualization of how application 110 would run on a group of devices 102 in FIG. 1. This visualization is performed without actually loading and running application 110 on each device in the group of devices 102. In this manner, device tester 104 in computer system 112 solves a technical problem with testing application 110 on different types 108 of devices 102 as encountered with current techniques in which application 110 is loaded onto each device in devices 102 that is tested.

The illustration of testing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, device tester 104 also may include a debugging function or process. The debugging function or process may allow for notes to be entered by operator 130. These notes may indicate what issues may be seen in viewing simulations 114 for the group of devices 102 as visualized on display system 118.

Figure 3:
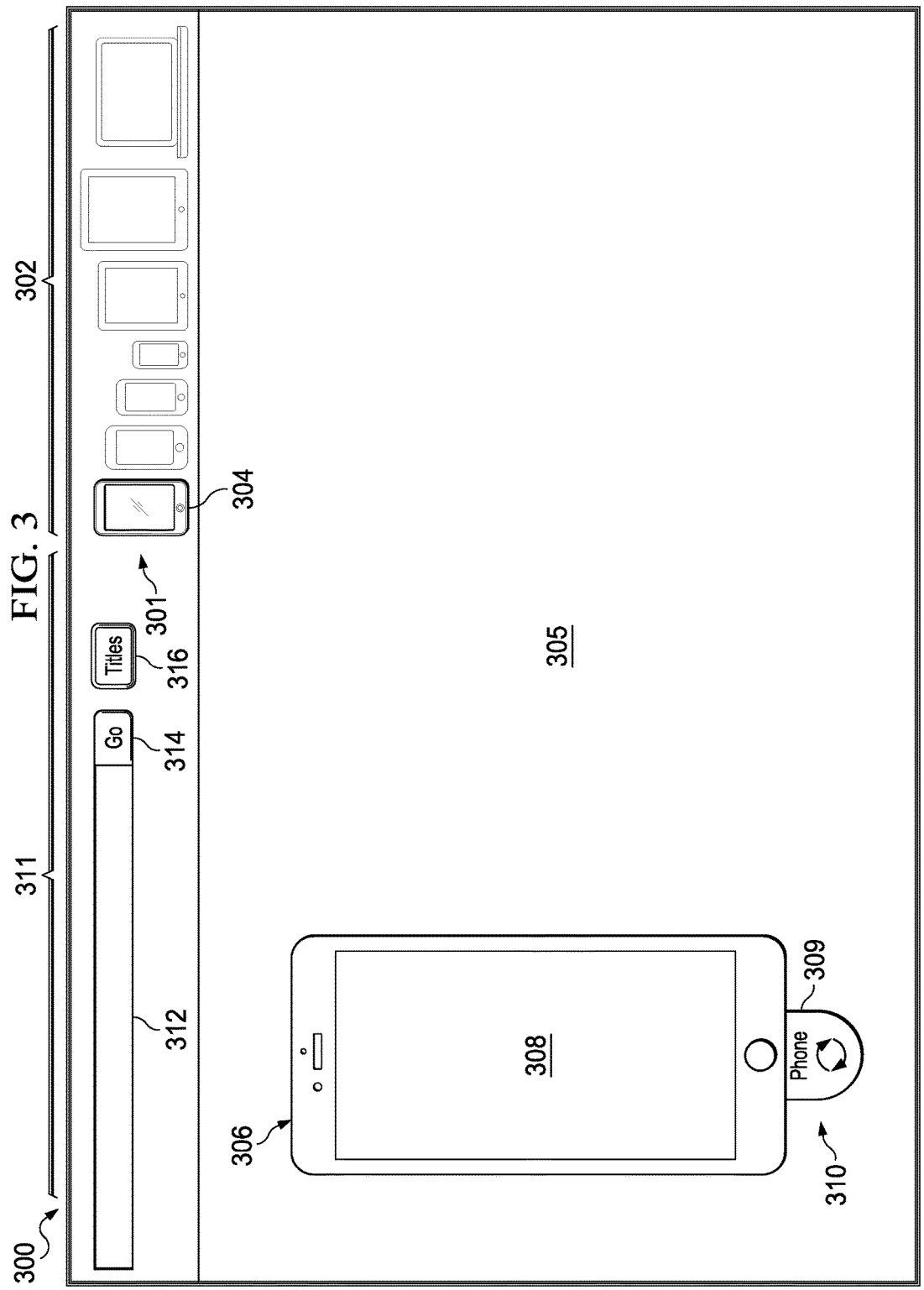
FIG. 3 is an illustration of a graphical user interface for testing an application on a group of devices in accordance with an illustrative embodiment.

FIGS. 3-11 are illustrative examples of a graphical user interface that may be used to interact with a device tester to manage simulations of an application for a group of devices. With reference first to FIG. 3, an illustration of a graphical user interface for testing an application on a group of devices is depicted in accordance with an illustrative embodiment.

As depicted, graphical user interface 300 is displayed in display system 118 in FIG. 1. Graphical user interface 300 is an interface displayed by device tester 104 in FIG. 1 in which simulations 114 of graphical user interface 116 for the group of devices 102 may be present.

Examples of simulations 114 shown in block diagram form in FIG. 1 are displayed on graphical user interface 300. For example, device tester 104 in FIG. 1 may use display system 118 to display simulations 114 on graphical user interface 300. In the illustrated example, device tester 104 displays simulations 114 on graphical representations 138 of the group of devices 102.

As depicted, graphical user interface 300 includes sections. Graphical user interface 300 shows a group of graphical elements 301 that represent the group of devices 102 in section 302. In this example, the group of graphical elements 301 includes a graphical element for each device in the group of devices 102. For example, the group of graphical elements 301 may be a group of icons representing the group of devices 102. An icon is an image that is selectable.

Section 302 receives user input selecting devices from the group of devices 102. The group of graphical elements 301 show which devices in the group of devices 102 are selected using at least one of a color, a pattern, a level of transparency, a shade of gray, an image, or other suitable type of indication. In this illustrative example, section 302 shows selected devices in the group of devices 102 as darker graphical elements and devices not selected in the group of devices 102 as lighter graphical elements.

As depicted, section 302 includes device 304. Device 304 is an example of a device in the group of devices 102 shown in block diagram form in FIG. 1. In this illustrative example, device 304 is selected.

Graphical user interface 300 shows graphical representations 138 for the group of devices 102 in section 305. Graphical representation 306 is an example of a graphical representation in graphical representations 138 shown in block diagram form in FIG. 1. In the illustrated example, graphical user interface 300 shows graphical representation 306 when device 304 is selected.

In this illustrative example, graphical representation 306 includes window 308 and device tab 309. Graphical user interface 300 shows simulations 114 of graphical user interface 116 for device 304 in window 308.

Device tab 309 receives user input selecting orientation for at least one of graphical representation 306 or graphical user interface 116 in window 308. A device tab is a selectable control for receiving user input. Device tab 309 is one of a group of device tabs 310 in section 305.

As depicted, section 311 in graphical user interface 300 includes field 312, button 314, and button 316. Field 312 receives user input for simulations 114 of application 110. For example, when application 110 is a web browser, user input to field 312 may be a selection of a location where information is located to be processed by the web browser. In this example, the user input is text entered into field 312. This text in field 312 is at least one of a universal resource locator, a file name, or other suitable type of identification for where information is located for the web browser. As depicted, user input selecting button 314 causes the user input received in field 312 to be sent to simulations 114.

User input selecting button 316 switches the display of the group of device tabs 310 on and off. Graphical user interface 300 shows the group of device tabs 310 when the display of the group of device tabs 310 is switched on. Graphical user interface 300 does not show the group of device tabs 310 when the display of the group of device tabs 310 is switched off. In this illustrative example, the display of the group of device tabs 310 is switched on.

Figure 4:
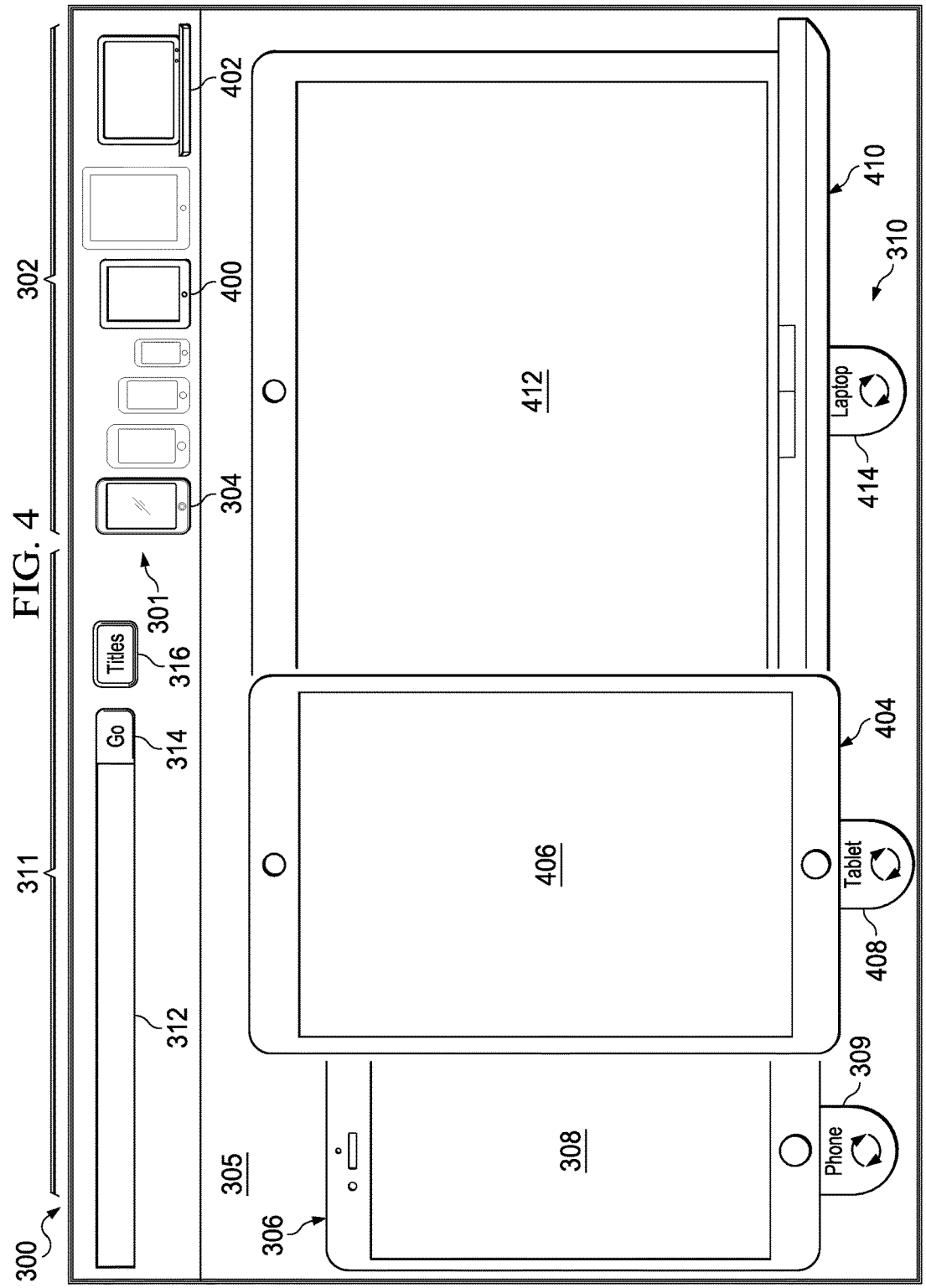
FIG. 4 is an illustration of a graphical user interface for testing an application on a group of devices in accordance with an illustrative embodiment.

With reference next to FIG. 4, an illustration of a graphical user interface for testing an application on a group of devices is depicted in accordance with an illustrative embodiment. In this illustrative example, user input selecting device 400 and device 402 in section 302 has been received.

Graphical user interface 300 shows graphical representation 404 for device 400. Graphical representation 404 includes window 406 and device tab 408. Graphical user interface 300 shows graphical representation 410 for device 402. Graphical representation 410 includes window 412 and device tab 414.

Graphical representation 404 and graphical representation 410 are examples of graphical representations 138 shown in block diagram form in FIG. 1. Device tab 408 and device tab 414 are examples of device tabs in the group of device tabs 310.

Figure 5:
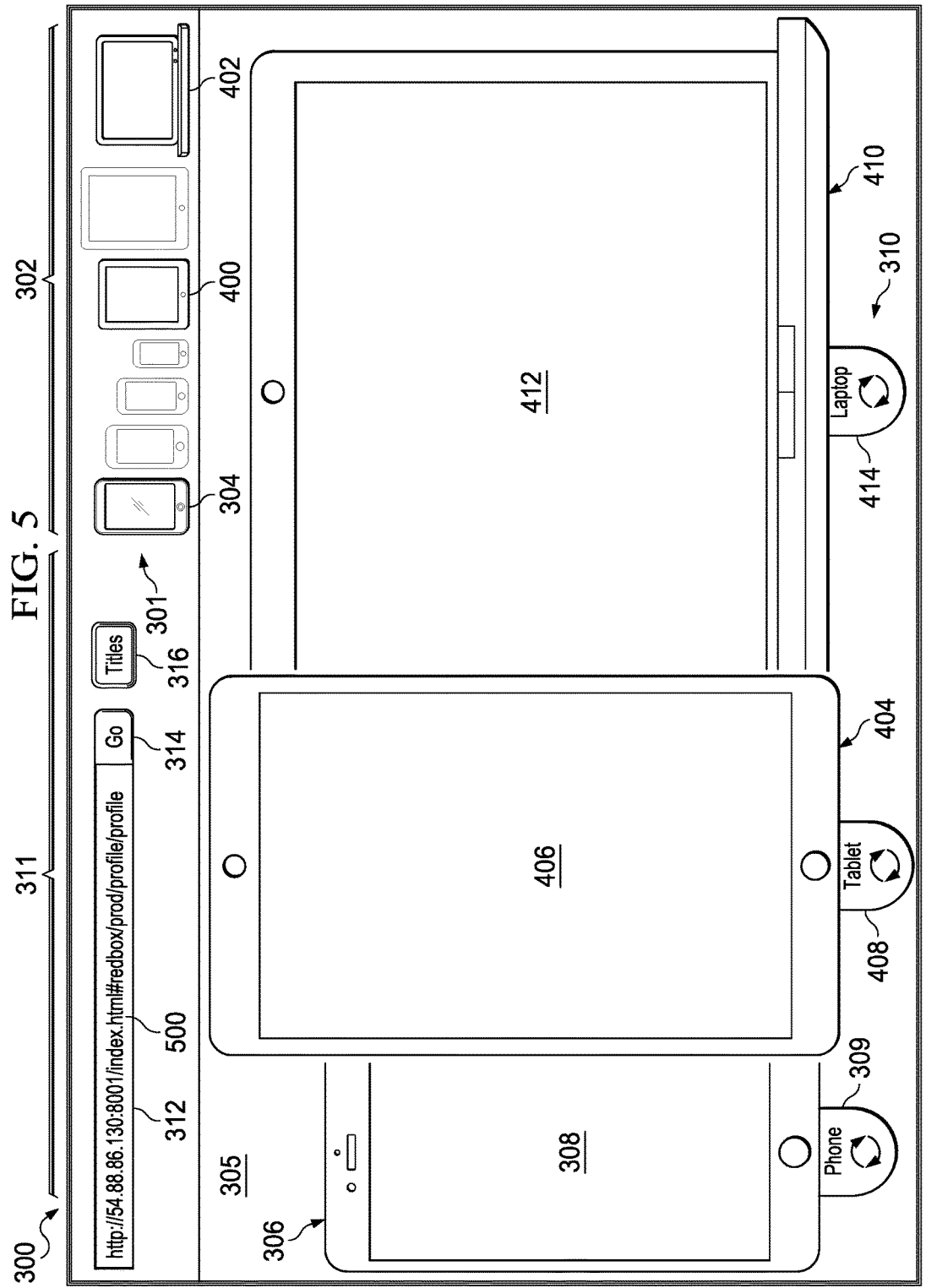
FIG. 5 is an illustration of a graphical user interface for testing an application on a group of devices in accordance with an illustrative embodiment.

Turning to FIG. 5, an illustration of a graphical user interface for testing an application on a group of devices is depicted in accordance with an illustrative embodiment. In this illustrative example, user input selecting text 500 in field 312 has been received. As depicted, text 500 is a universal resource locator.

Figure 6:
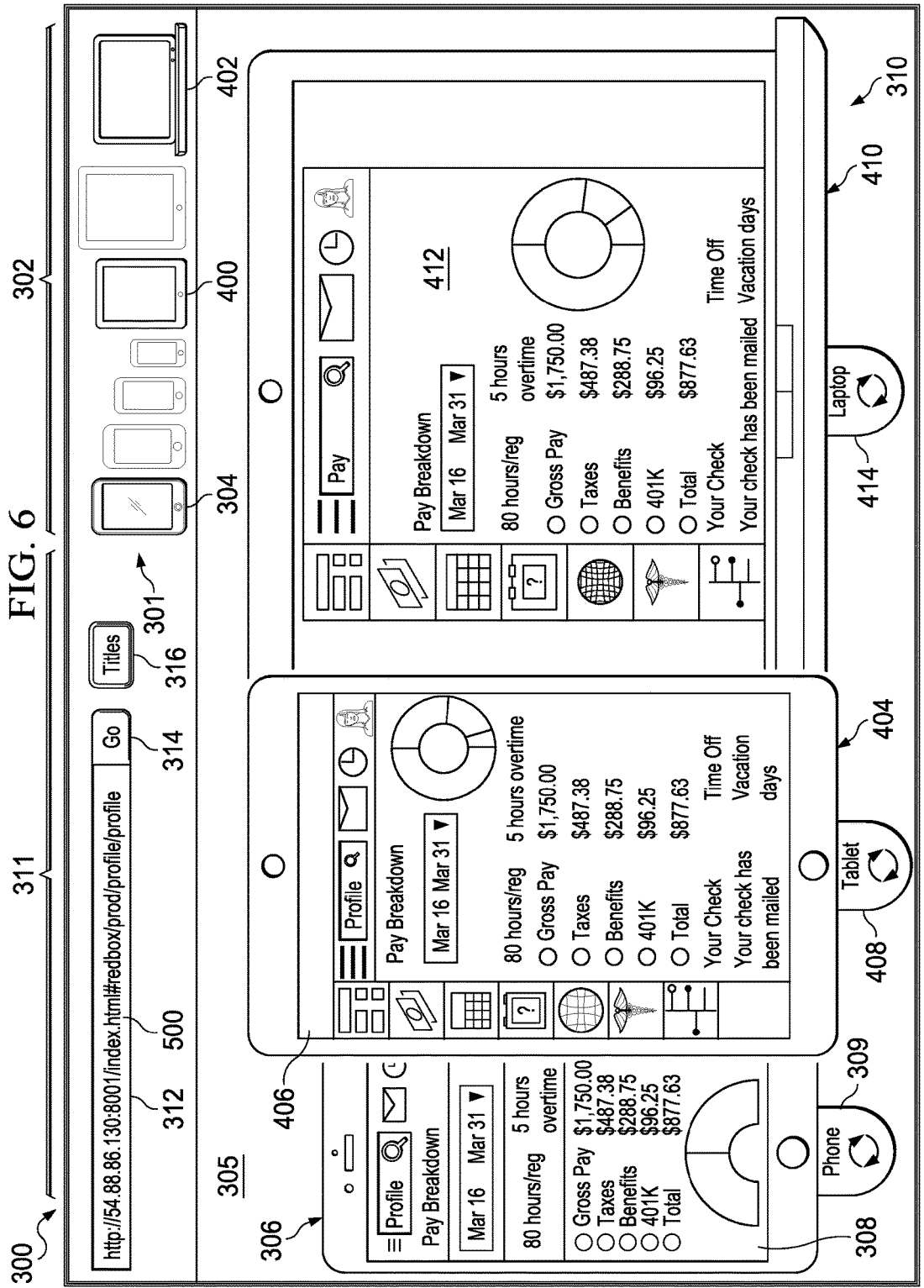
FIG. 6 is an illustration of a graphical user interface for testing an application on a group of devices in accordance with an illustrative embodiment.

Turning next to FIG. 6, an illustration of a graphical user interface for testing an application on a group of devices is depicted in accordance with an illustrative embodiment. In this illustrative example, user input selecting button 314 has been received.

As depicted, window 308, window 406, and window 412 show a web page in simulations 114 of graphical user interface 116 for application 110. In this illustrative example, application 110 is a web browser. These windows show the web page that is located at the universal resource locator in text 500.

Window 308 shows what the web page would look like on graphical user interface 116 on the web browser in device 304. Window 406 shows what the web page would look like on graphical user interface 116 on the web browser in device 400. Window 412 shows what the web page would look like in graphical user interface 116 on the web browser in device 402. These windows may show differences in what the web page would look like when displayed on these devices.

Figure 7:
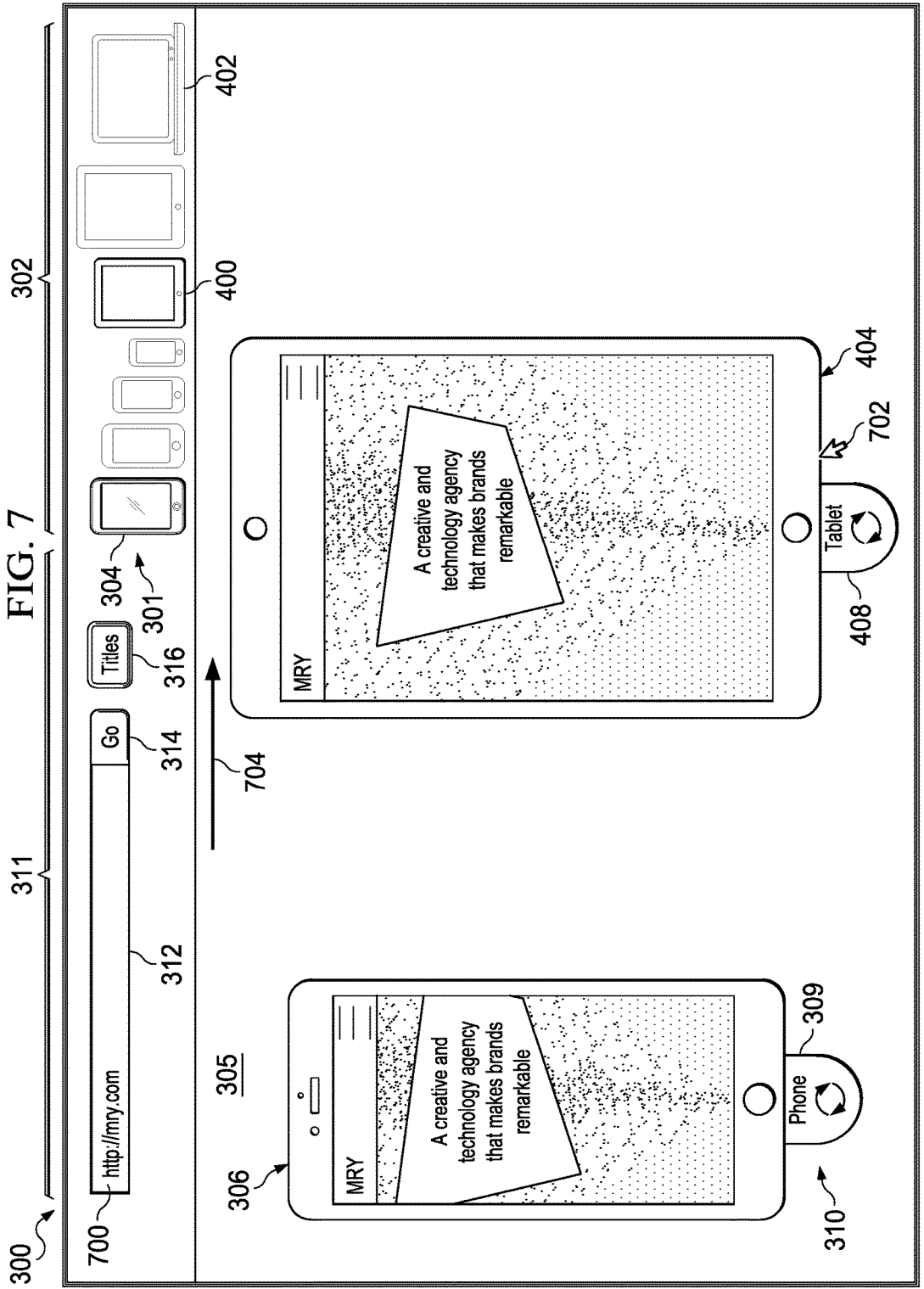
FIG. 7 is an illustration of a graphical user interface for testing an application on a group of devices in accordance with an illustrative embodiment.

In FIG. 7, an illustration of a graphical user interface for testing an application on a group of devices is depicted in accordance with an illustrative embodiment. As depicted, user inputs have been received.

In this illustrative example, user input selecting to not show device 402 has been received. User input selecting text 700 in field 312 has also been received. Text 700 is a universal resource locator.

As depicted, user input 702 moving graphical representation 404 in the direction of arrow 704 has been received. In this illustrative example, user input 702 is for a drag and drop operation.

Figure 8:
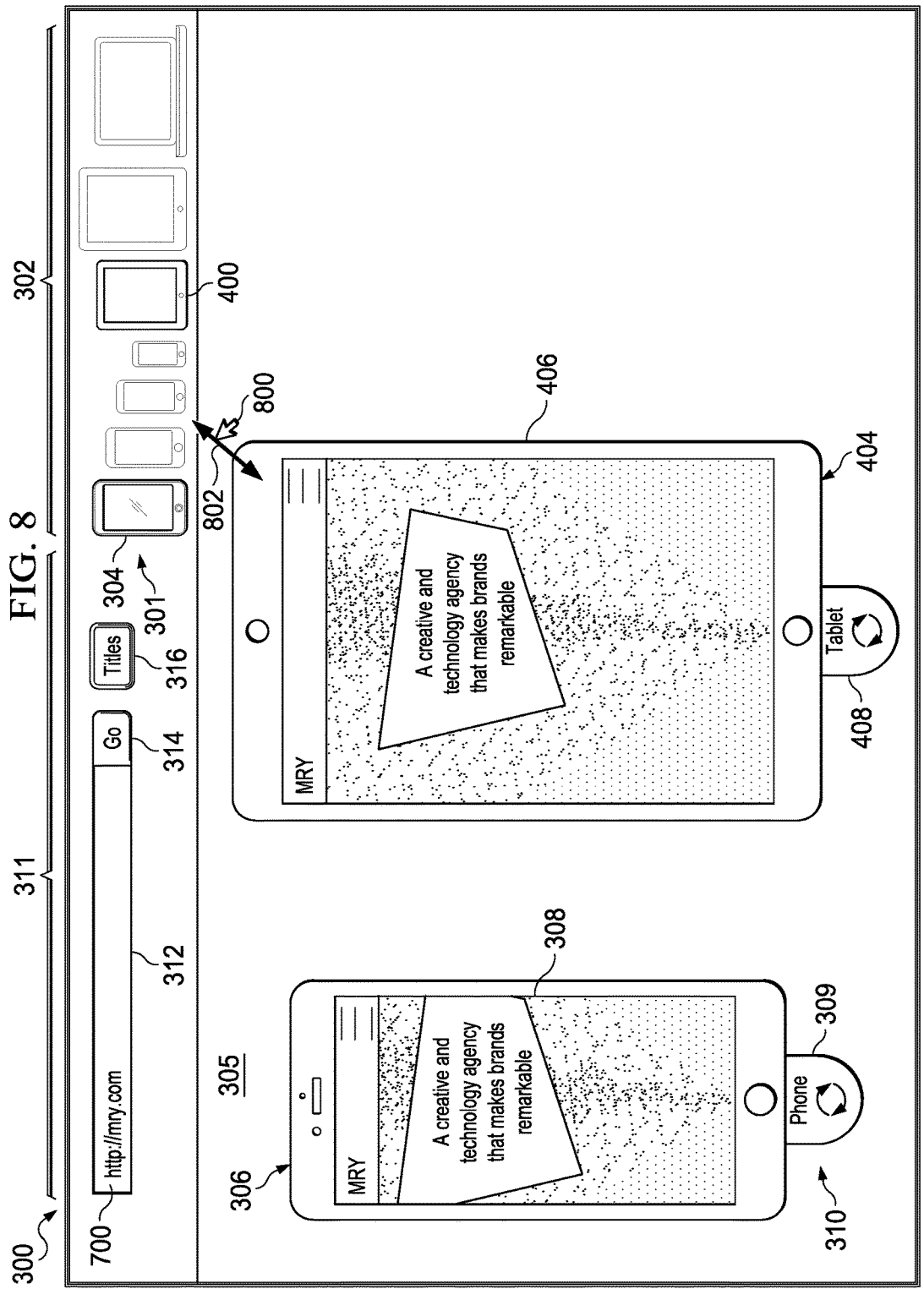
FIG. 8 is an illustration of a graphical user interface for testing an application on a group of devices in accordance with an illustrative embodiment.

With reference to FIG. 8, an illustration of a graphical user interface for testing an application on a group of devices is depicted in accordance with an illustrative embodiment. In this illustrative example, user input 800 changing the size of graphical representation 404 in the direction of arrow 802 has been received. As depicted, user input 800 is for a sizing operation. In this example, the sizing operation includes moving a pointer to the corner of graphical representation 404, selecting the corner, and then dragging the corner in the direction of arrow 802.

Figure 9:
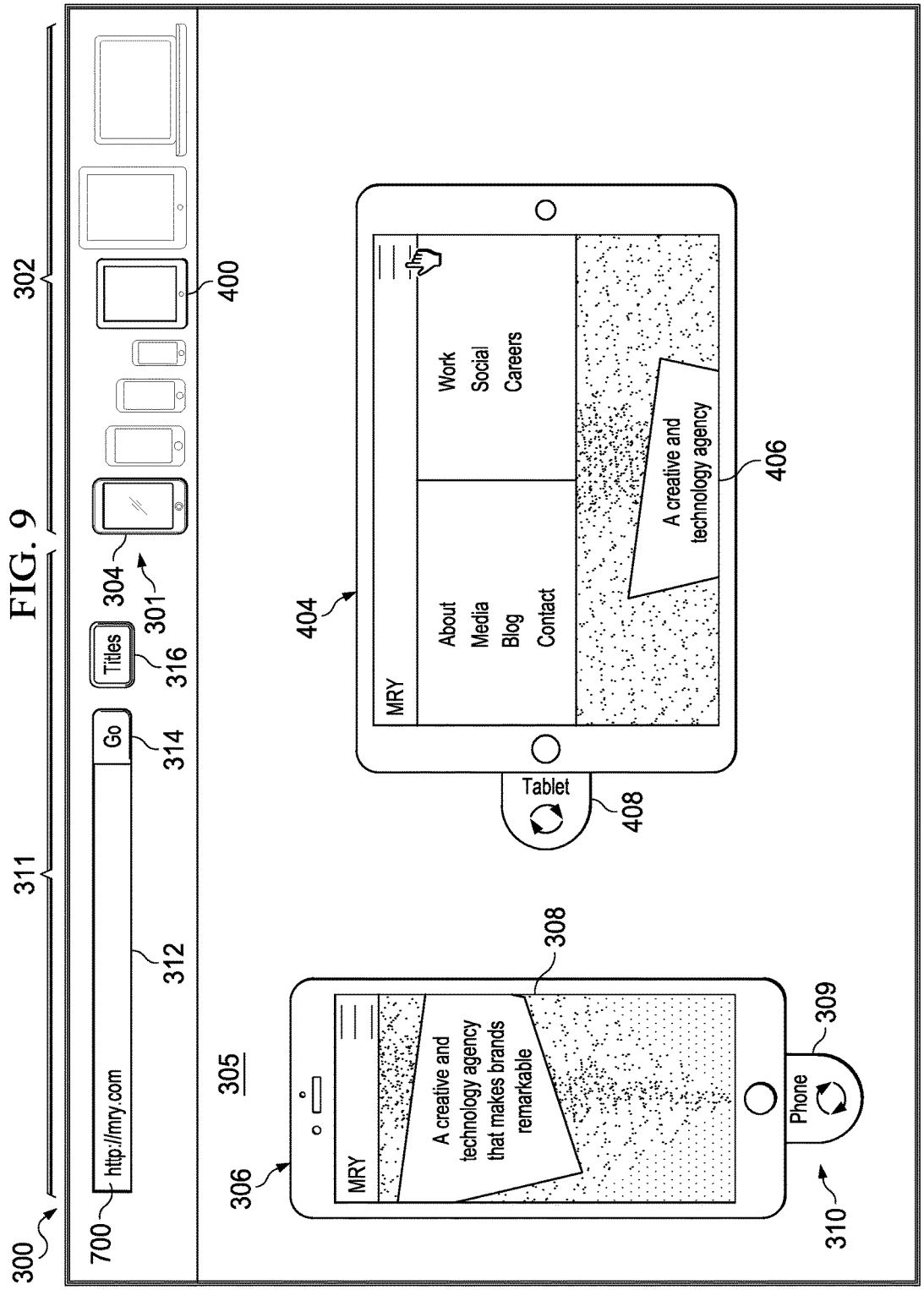
FIG. 9 is an illustration of a graphical user interface for testing an application on a group of devices in accordance with an illustrative embodiment.

With reference next to FIG. 9, an illustration of a graphical user interface for testing an application on a group of devices is depicted in accordance with an illustrative embodiment. In this illustrative example, user input selecting device tab 408 has been received.

As depicted, the user input selecting device tab 408 has set the orientation of graphical representation 404 to landscape. Window 406 now shows what the web page would look like on graphical user interface 116 on the web browser in device 400 when the orientation of device 400 is landscape.

Figure 10:
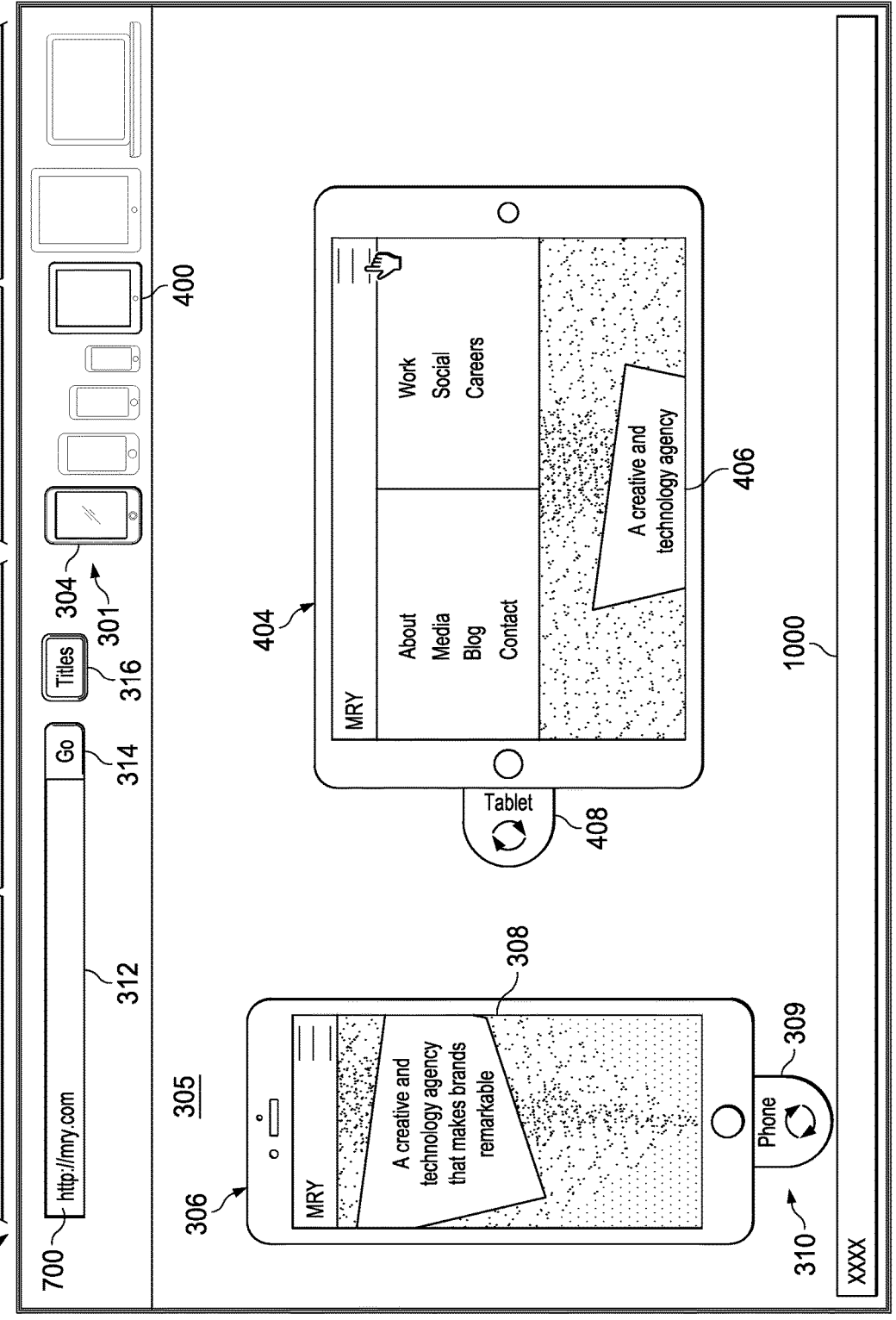
FIG. 10 is an illustration of a graphical user interface for testing an application on a group of devices in accordance with an illustrative embodiment.

Referring now to FIG. 10, an illustration of a graphical user interface for testing an application on a group of devices is depicted in accordance with an illustrative embodiment. In this illustrative example, graphical user interface 300 shows field 1000.

As depicted, field 1000 shows information about simulations 114 of application 110. For example, field 1000 may show instructions for a test case for simulations 114. In this example, the instructions may include an instruction to provide user input to the web page shown in window 308. As another example, field 1000 may show information about a problem with the test case.

In this illustrative example, field 1000 may receive user input about simulations 114 of application 110. For example, field 1000 may receive user input identifying an issue. This issue may be with one of simulations 114 not showing an item. This item may be at least one of a particular piece of information, a logo, an advertisement, a control, or other suitable type of item shown in simulations 114 of application 110.

As another example, field 1000 may receive user input identifying that the issue with simulations 114 no longer exists. In this example, graphical user interface 300 may stop displaying field 1000 when the issue with simulations 114 no longer exists.

Figure 11:
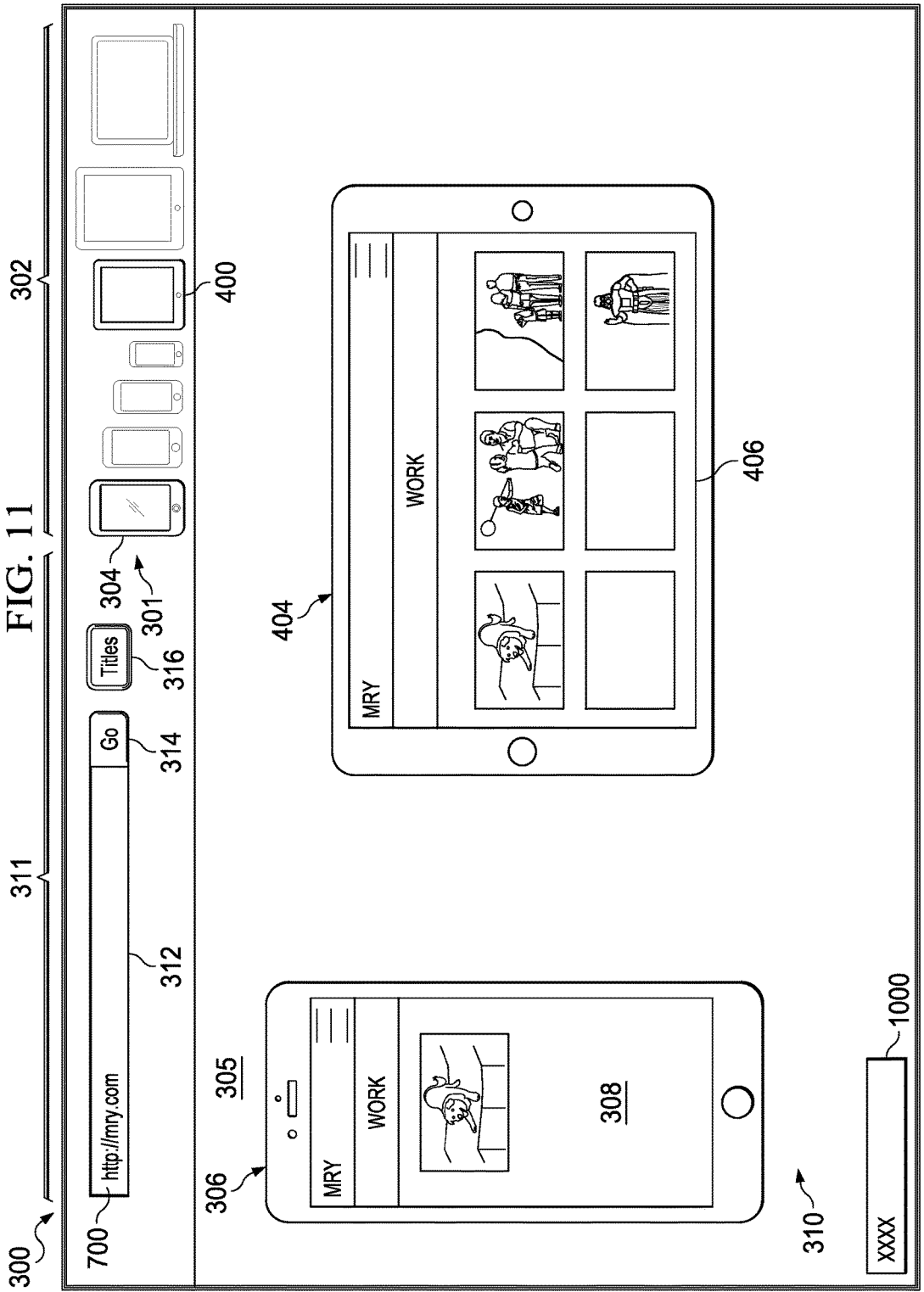
FIG. 11 is an illustration of a graphical user interface for testing an application on a group of devices in accordance with an illustrative embodiment.

Turning to FIG. 11, an illustration of a graphical user interface for testing an application on a group of devices is depicted in accordance with an illustrative embodiment. As depicted, user input selecting button 316 has been received. The user input selecting button 316 has switched off the display of the group of device tabs 310.

Turning next to FIG. 12, an illustration of a flowchart of a process for testing an application is depicted in accordance with an illustrative embodiment. The process illustrated in FIG. 12 may be implemented in testing environment 100 in FIG. 1. In particular, the process may be implemented in device tester 104 in computer system 112 in FIG. 1.

The process begins by displaying graphical elements for devices in a display system (step 1200). The graphical elements are for devices that may be tested in this illustrative example. In the illustrative example, each of the devices may be a different type of device from the others in this illustrative example.

The process then receives a selection of a group of the different types of devices (step 1202). In this illustrative example, the selection in step 1202 is received from user input selecting graphical elements for the devices.

The process displays simulations of a graphical user interface for an application for the group of the different types of devices on the display system (step 1204). The process displays a group of controls in the graphical user interface displayed in the group of the different types of devices on the display system (step 1206).

The process displays a change to the graphical user interface in all of the simulations when a user input manipulates a control in a simulation in the simulations (step 1208), with the process terminating thereafter. The change to the graphical user interface may be displayed in all of the simulations. In some illustrative examples, the change may be displayed only in the simulation to which the user input was applied.

In this manner, testing of the graphical user interface for an application for the group of devices is enabled. This testing may be performed more quickly and more easily than with currently used techniques for testing applications on different types of devices.

With reference to FIG. 13, an illustration of a flowchart of a process for manipulating a graphical representation of a device is depicted in accordance with an illustrative embodiment. The process illustrated in FIG. 13 may be implemented in testing environment 100 in FIG. 1. In particular, the process may be implemented in device tester 104 in computer system 112 in FIG. 1.

The process begins by receiving user input to change an orientation of a graphical representation of a device in a display system (step 1300). The process identifies the orientation of the graphical representation (step 1302). If the orientation of the graphical representation is portrait, the process changes the orientation to landscape (step 1304). If the orientation of the graphical representation is landscape, the process changes the orientation to portrait (step 1306). The process then sets the orientation of a graphical user interface being simulated in the graphical representation to the orientation of the graphical representation (step 1308), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 14:
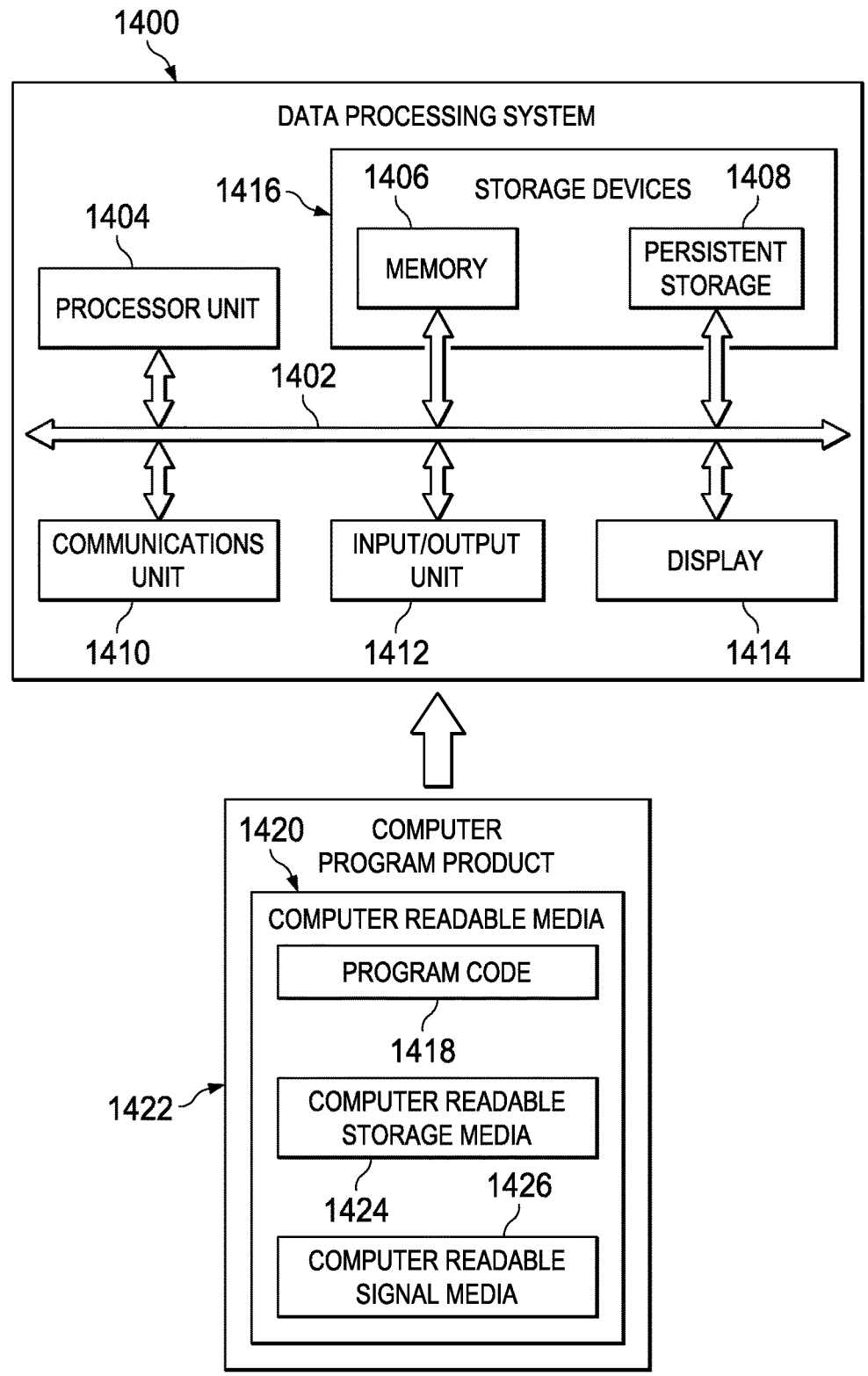
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 may be used to implement computer system 112 in FIG. 1. Data processing system 1400 also may be used implement devices 102 in FIG. 1.

In this illustrative example, data processing system 1400 includes communications framework 1402, which provides communications between processor unit 1404, memory 1406, persistent storage 1408, communications unit 1410, input/output (I/O) unit 1412, and display 1414. In this example, communication framework may take the form of a bus system.

Processor unit 1404 serves to execute instructions for software that may be loaded into memory 1406. Processor unit 1404 may be a number of processors, a multi-processor core, or some other type of processor, depending on the particular implementation.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through at least of a keyboard, a mouse, or some other suitable input device. Further, input/output unit 1412 may send output to a printer. Display 1414 provides a mechanism to display information to a user.

Instructions for at least one of the operating system, applications, or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these illustrative examples. In one example, computer readable media 1420 may be computer readable storage media 1424 or computer readable signal media 1426. In these illustrative examples, computer readable storage media 1424 is a physical or tangible storage device used to store program code 1418 rather than a medium that propagates or transmits program code 1418.

Alternatively, program code 1418 may be transferred to data processing system 1400 using computer readable signal media 1426. Computer readable signal media 1426 may be, for example, a propagated data signal containing program code 1418. For example, computer readable signal media 1426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code 1418.

Thus, the illustrative embodiments provide a method and apparatus for testing applications. With a device tester in the illustrative examples, an application may be tested on multiple devices. This testing may be performed at the same time through simulations of the application on the devices. The different simulations may be displayed on the display system without an operator having to view the display on each device being tested.

In the illustrative examples, a user input made to a control in the graphical user interface for the application in one simulation may cause a change in the display of the graphical user interface. In one illustrative example, this change may be displayed in the simulations even though the user input was applied to the control in one of the simulations.

In this manner, testing an application for different types of devices is enabled. The application may be tested more easily and quickly as compared to currently testing systems.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for testing an application, the method comprising:
   selecting, by a computer system, a group of different types of devices from a first group of graphical representations of physical appearances of device housings for the group of different types of devices displayed in a first section of a display system;

in response to selecting the group of different types of devices from the first group of graphical representations of the physical appearances of the device housings for the group of different types of devices, displaying, by the computer system, a second group of graphical representations of the physical appearances of the device housings for the group of different types of devices in a second section of the display system;

displaying, by the computer system, simulations of a graphical user interface for the application for the group of different types of devices on the display system, wherein the simulations of the graphical user interface for the application for the group of different types of devices are displayed on the physical appearances of the device housings for the second group of graphical representations of the physical appearances of the device housings for the group of different types of devices;

displaying, by the computer system, a group of controls in the graphical user interface for the application for the group of different types of devices displayed in the group of different types of devices in the second section of the display system; and displaying, by the computer system, a change to the graphical user interface for the application for the group of different types of devices in all of the simulations of the graphical user interface for the application for the group of different types of devices when a user input manipulates a control in a simulation in the simulations of the graphical user interface for the application for the group of different types of devices, wherein a testing of the graphical user interface for the application for the group of different types of devices is enabled.

2. The method of claim 1 further comprising:

changing, by the computer system, a display of the graphical user interface for the application for the group of different types of devices in the simulation when a further user input changes an orientation of a device in the group of different types of devices corresponding to the simulation.

3. The method of claim 1 further comprising:

changing, by the computer system, a first size of a graphical representation in the second group of graphical representations of the physical appearances of the device housings for the group of different types of devices displayed on the display system when a further user input is received changing the first size of the graphical representation; and changing, by the computer system, a second size of the simulation in the simulations of the graphical user interface for the application for the group of different types of devices for the graphical representation to fit within the graphical representation with the first size of the graphical representation.

4. The method of claim 1 further comprising:

changing, by the computer system, a first location of a graphical representation in the second group of graphical representations of the physical appearances of the device housings for the group of different types of devices displayed on the display system when a further user input is received changing the first location of the graphical representation; and changing, by the computer system, a second location of the simulation in the simulations of the graphical user interface for the application for the group of different types of devices for the graphical representation to fit within the graphical representation with the first location of the graphical representation.

5. The method of claim 1, wherein the application is one of a web browser, a word processor, a spreadsheet, a presentation application, a human resources application, or a payroll application.

6. The method of claim 1, wherein the control is selected from one of a dial, a slider, a check box, a link, and a button.

7. A computer system comprising:

a display system; and a device tester in communication with the display system, wherein the device tester selects a group of different types of devices from a first group of graphical representations of physical appearances of device housings for the group of different types of devices displayed in a first section of a display system; in response to selecting the group of different types of devices from the first group of graphical representations of the physical appearances of the device housings for the group of different types of devices, displays a second group of graphical representations of the physical appearances of the device housings for the group of different types of devices in a second section of the display system; displays simulations of a graphical user interface for an application for the group of different types of devices on the display system, wherein the simulations of the graphical user interface for the application for the group of different types of devices are displayed on the physical appearances of the device housings for the second group of graphical representations of the physical appearances of the device housings for the group of different types of devices; displays a group of controls in the graphical user interface for the application for the group of different types of devices displayed in the group of different types of devices in the second section of the display system; and displays a change to the graphical user interface for the application for the group of different types of devices in all of the simulations of the graphical user interface for the application for the group of different types of devices when a user input manipulates a control in a simulation in the simulations of the graphical user interface for the application for the group of different types of devices, wherein a testing of the graphical user interface for the application for the group of different types of devices is enabled.

8. The computer system of claim 7, wherein the device tester changes a display of the graphical user interface for the application for the group of different types of devices in the simulation when a further user input changes an orientation of a device in the group of different types of devices corresponding to the simulation.

9. The computer system of claim 7, wherein the device tester changes a first size of a graphical representation in the second group of graphical representations of the physical appearances of the device housings for the group of different types of devices displayed on the display system when a further user input is received changing the first size of the graphical representation and changes a second size of the simulation in the simulations of the graphical user interface for the application for the group of different types of devices for the graphical representation to fit within the graphical representation with the first size of the graphical representation.

10. The computer system of claim 7, wherein the device tester changes a first location of a graphical representation in the second group of graphical representations of the physical appearances of the device housings for the group of different types of devices displayed on the display system when a further user input is received changing the first location of the graphical representation and changes a second location of the simulation in the simulations of the graphical user interface for the application for the group of different types of devices for the graphical representation to fit within the graphical representation with the first location of the graphical representation.

11. The computer system of claim 7, wherein the application is one of a web browser, a word processor, a spreadsheet, a presentation application, a human resources application, or a payroll application.

12. The computer system of claim 7, wherein the control is selected from one of a dial, a slider, a check box, a link, and a button.

13. A computer program product for testing an application, the computer program product comprising:
a non-transitory computer readable storage medium;
program code, stored on the non-transitory computer readable storage medium, configured to select a group of different types of devices from a first group of graphical representations of physical appearances of device housings for the group of different types of devices displayed in a first section of a display system;
program code, stored on the non-transitory computer readable storage medium, configured to display a second group of graphical representations of the physical appearances of the device housings for the group of different types of devices in a second section of the display system in response to selecting the group of different types of devices from the first group of graphical representations of the physical appearances of the device housings for the group of different types of devices;
program code, stored on the non-transitory computer readable storage medium, configured to display simulations of a graphical user interface for the application for the group of different types of devices on the display system, wherein the simulations of the graphical user interface for the application for the group of different types of devices are displayed on the physical appearances of the device housings for the second group of graphical representations of the physical appearances of the device housings for the group of different types of devices;
program code, stored on the non-transitory computer readable storage medium, configured to display a group of controls in the graphical user interface for the application for the group of different types of devices displayed in the group of different types of devices in the second section of the display system; and
program code, stored on the non-transitory computer readable storage medium, configured to display a change to the graphical user interface for the application for the group of different types of devices in all of the simulations of the graphical user interface for the application for the group of different types of devices when a user input manipulates a control in a simulation in the simulations of the graphical user interface for the application for the group of different types of devices, wherein a testing of the graphical user interface for the application for the group of different types of devices is enabled.

14. The computer program product of claim 13 further comprising:
program code, stored on the non-transitory computer readable storage medium, configured to change a display of the graphical user interface for the application for the group of different types of devices in the simulation when a further user input changes an orientation of a device in the group of different types of devices corresponding to the simulation.

* * * * *